United States Patent
Schmidt et al.

(10) Patent No.: US 10,239,258 B2
(45) Date of Patent: Mar. 26, 2019

(54) TECHNIQUES FOR OPTIMIZING ORIENTATION OF MODELS FOR THREE-DIMENSIONAL PRINTING

(71) Applicant: AUTODESK, INC., San Rafael, CA (US)

(72) Inventors: Ryan Michael Schmidt, Toronto (CA); Nobuyuki Umetani, Zurich (CH)

(73) Assignee: AUTODESK, INC., San Rafael, CA (US)

( * ) Notice: Subject to any disclaimer, the term of this patent is extended or adjusted under 35 U.S.C. 154(b) by 979 days.

(21) Appl. No.: 14/544,158

(22) Filed: Dec. 2, 2014

(65) Prior Publication Data

US 2015/0154321 A1 Jun. 4, 2015

Related U.S. Application Data

(60) Provisional application No. 61/911,311, filed on Dec. 3, 2013.

(51) Int. Cl.
   *G06F 19/00* (2018.01)
   *B29C 64/386* (2017.01)
   (Continued)

(52) U.S. Cl.
   CPC ............ *B29C 64/386* (2017.08); *B29C 64/40* (2017.08); *G05B 19/4099* (2013.01); *B33Y 50/02* (2014.12);
   (Continued)

(58) Field of Classification Search
   CPC .................................................. B29C 67/0092
   (Continued)

(56) References Cited

U.S. PATENT DOCUMENTS

| 6,721,023 | B1 * | 4/2004 | Weiss | G02B 27/2278 |
| | | | | 348/E13.005 |
| 7,020,539 | B1 * | 3/2006 | Kovacevic | B22F 3/1055 |
| | | | | 483/16 |

(Continued)

FOREIGN PATENT DOCUMENTS

JP 2004110793 A * 4/2004

OTHER PUBLICATIONS

Botsch, et al., "PriMo: Coupled Prisms for Intuitive Surface Modeling", In Proc. of the 4th Eurographics Symposium on Geometry Processing, 2006, 10 pages.

(Continued)

*Primary Examiner* — Evral E Bodden
(74) *Attorney, Agent, or Firm* — Artegis Law Group, LLP

(57) ABSTRACT

In one embodiment of the present invention, a print orientation tool efficiently determines an orientation of a three-dimensional (3D) model such that, when 3D printed, the structural integrity of the resulting 3D object is optimized. In operation, the print orientation tool configures a stress analysis engine to slice the 3D model into two-dimensional (2D) cross-sections. The stress analysis engine then compute structural stresses associated with the 2D cross-sections. The print orientation tool translates the structural stresses to weakness metrics. Subsequently, the print orientation tool evaluates the orientations of the cross-sections in conjunction with the corresponding weakness metrics to select a printing orientation that minimizes weaknesses in the 3D model. Advantageously, by aligning the 3D model to the print bed based on the optimized printing orientation, the user mitigates weaknesses in the corresponding 3D object attributable to the 3D printing manufacturing process.

20 Claims, 8 Drawing Sheets
(3 of 8 Drawing Sheet(s) Filed in Color)

(51) Int. Cl.
*G05B 19/4099* (2006.01)
*B29C 64/40* (2017.01)
*G06F 17/50* (2006.01)
*B33Y 50/02* (2015.01)

(52) U.S. Cl.
CPC .... *G05B 2219/49038* (2013.01); *G06F 17/50* (2013.01); *G06F 2217/12* (2013.01); *Y02P 90/265* (2015.11)

(58) Field of Classification Search
USPC .......................................................... 700/98
See application file for complete search history.

(56) References Cited

U.S. PATENT DOCUMENTS

| | | | | |
|---|---|---|---|---|
| 7,346,408 | B2* | 3/2008 | Van Bael | G06F 3/04845 700/182 |
| 8,175,734 | B2* | 5/2012 | Fogel | G06F 17/50 700/119 |
| 2007/0233298 | A1* | 10/2007 | Heide | G06F 17/50 700/98 |
| 2010/0071222 | A1* | 3/2010 | Solomon | G01B 5/207 33/556 |
| 2010/0217429 | A1* | 8/2010 | Kritchman | G05B 19/4099 700/119 |
| 2014/0086780 | A1* | 3/2014 | Miller | A61F 5/01 419/1 |
| 2015/0269289 | A1* | 9/2015 | Kim | G06F 17/5009 703/6 |
| 2015/0269290 | A1* | 9/2015 | Nelaturi | G06F 17/5009 703/6 |
| 2015/0278414 | A1* | 10/2015 | Zhou | G06F 17/5018 703/2 |

OTHER PUBLICATIONS

Gibson et al., "Additive Manufacturing Technologies: Rapid Prototyping to Direct Digital Manufacturing", 1st ed. Springer Publishing, Inc., 2009, 30 pages.

Luo, et al., "Chopper: partitioning models into 3D-printable parts", ACM Transactions on Graphics, vol. 31, Issue 6, Nov. 2012, pp. 129:1-129:9.

Miklos et al., "Discrete Scale Axis Representations for 3D Geometry", ACM Transactions on Graphics, vol. 29, Issue 4, Jul. 2010, pp. 101:1-101:10.

Panozzo, et al., "Designing unreinforced masonry models", ACM Transactions on Graphics, vol. 32, Issue 4, Jul. 2013, pp. 91:1-91:12.

Prevost, et al., "Make it stand: balancing shapes for 3d fabrication", ACM Transactions on Graphics, vol. 32, Issue 4 Jul. 2013, pp. 81:1-81:10.

Schmidt et al., "MeshMixer: An Interface for Rapid Mesh Composition", ACM SIGGRAPH 2010 Talks, Jul. 2010.

Stava, et al., "Stress Relief: Improving Structural Strength of 3D Printable Objects", ACM Transactions on Graphics, vol. 31, Issue 4, Jul. 2012, pp. 48:1-48:11.

Timoshenko, et al., "Theory of Elasticity", 3rd Ed., Mcgraw-Hill College, 6, 1970.

Umetani, et al., "Guided exploration of physically valid shapes for furniture design", ACM Transactions on Graphics, vol. 31, Issue 4, Jul. 2012, pp. 86:1-86:11.

Whiting, et al., "Structural optimization of 3D masonry buildings", ACM Transactions on Graphics, vol. 31, Issue 6 Nov. 2012, pp. 159:1-159:11.

Zhou, et al., "Worst-case structural analysis", ACM Transactions on Graphics, vol. 32, Issue 4, Jul. 2013, pp. 137:1-137:12.

\* cited by examiner

Virtual cross-section. To implement the EB assumption on 3D objects, we first need to construct a cross section and neutral axis $(\Omega, z)$ such that $z$ is perpendicular to $\Omega$ and passes through the centroid of $\Omega$. Although the medial axis [Miklos et al. 2010] can be used to find candidates, the medial axis is costly to generate. Instead we introduce a fast *virtual cross section* technique to approximately generate $(\Omega, z)$. First, take an arbitrary cross section of the 3D object $\Gamma$ which has a normal direction $n \in \mathbb{R}^3$. We consider another section $\Gamma'$ at a small distance $\Delta n$ that has the same normal direction $n$. For sections $\Gamma$ and $\Gamma'$, we compute the centroids $g$ and $g'$. Next, we compute a neutral axis direction $\bar{z}$ as $\bar{z} = (g' - g)/|g' - g|$ with infinitesimally-small distance $\Delta n \to 0$. Finally, we get a virtual cross-section $\Omega$ by projecting $\Gamma$ perpendicular to $\bar{z}$ so that the centroid of $\Omega$ remains $g$.

We consider the local coordinate $x$ and $y$ on the virtual cross section $\Omega$ taking the origin at centroid $g$. We define axis $y$ such that it is on the original section $\Gamma$. If the angle between $n$ and $x$ — denoted $\theta$ — is large, the virtual section is no longer a good approximation of an actual section in the direction of $\bar{z}$. Hence, we discard sections where $\theta > 45°$. We consider a fixed set sample directions for $n$, specifically the 13 unique directions of the form $(A, B, C)^T$, where each of $A, B, C$ takes the values $\{-1, 0, +1\}$.

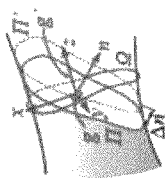

Internal bending moment. Using the EB assumption, we can denote the $z$-directional strain as a linear function of $xy$-coordinate $\epsilon(x, y) = \epsilon_x x + \epsilon_y y$. From Hooke's law, $z$-directional stress is given as $\sigma = E\epsilon$ where $E$ is the Young's modulus. We define orthogonal axes $\xi$ and $\eta$ such that strain is zero ($\epsilon_x x + \epsilon_y y = 0$) on the axis $\xi$. Let $\psi$ be the angle between $\xi$ and $x$. With this axis transformation, the strain can be denoted in $\xi\eta$-coordinate as $\epsilon(\xi, \eta) = \epsilon_\xi \eta$, where $\epsilon_\xi = \epsilon_x \cos\psi + \epsilon_y \sin\psi$. The Internal bending moment vector then becomes:

$$\tau^{in} = \int_\Omega \eta(E\epsilon)d\Omega\xi = \epsilon_\xi E I_\xi \xi,\qquad(2)$$

where $I_\xi$ is the *second moment of area*, $I_\xi = \int_\Omega \eta^2 d\Omega$.

External bending moment. Given a virtual cross section and its neutral axis direction $(\Gamma, n) \to (\Omega, z)$, we now consider bending moment equilibrium to compute the stress on $\Omega$. We assume the external force $f$ is applied at a point $p$ on the object's surface. The resulting external bending moment $\tau^{ex} \in \mathbb{R}^3$ which rotates the virtual cross section can be written as $$\tau^{ex} = (\mathbf{I} - z \otimes z)((p - g) \times f),\qquad(1)$$

where $\mathbf{I}$ is an identity matrix. Note that $\tau^{ex}$ is in the plane of $\Omega$. To achieve momentum equilibrium, the virtual cross section must generate a bending moment which balances out this external moment.

Moment equilibrium. Considering the moment equilibrium $\tau^{ex} + \tau^{in} = 0$, we obtain $\xi = \tau^{ex}/|\tau^{ex}|$ and $\epsilon_\xi = |\tau^{ex}|/(EI_\xi)$. The maximum stress on the virtual cross section can be written as $\sigma_{max} = |\tau^{ex}||\eta|_{max}/Z_\xi$, where $Z_\xi = I_\xi/|\eta|_{max}$ and $|\eta|_{max}$ is the maximum of the absolute value of coordinate $\eta$ inside this virtual cross section. In the engineering literature, $Z_\xi$ is called the *section modulus*, relating the bending moment and maximum stress. When $\sigma_{max}$ exceeds $\bar{\sigma}_L$, this section may fracture. Note that the maximum stress doesn't depend on the Young's modulus or other material parameters; based on the cross-section, force position, and direction, we can estimate stress inside the object in a purely geometric manner.

Virtual Cross-Section Heuristic 310

Internal Bending Moment Heuristic 360

External Bending Moment Heuristic 350

Moment Equilibrium Heuristic 370

FIGURE 3

Weakness evaluation. Structural weakness of a cross section is defined considering two factors: the magnitude of force needed to break a section, and the area over which the force is distributed. Let $f_{min}(\Gamma, \mathbf{p}, \psi)$ be the minimal force at position $\mathbf{p}$ on the surface needed to produce the critical stress on section $\Omega$ with bending direction $\psi$. From Eq. 1 and Eq. 2, we have $$f_{min}(\Gamma, \mathbf{p}, \psi) = |(\mathbf{I} - \xi \otimes \xi)(\mathbf{p} - \mathbf{g})| \bar{\sigma}_L Z_\xi \eta \qquad (3)$$

Next we define a function $B(\Gamma, \mathbf{p}, \psi)$ which indicates the relative ease with which a section/force configuration can be broken. $B$ is defined as $1/f_{min}$ if $|f_{min}| < f_{max}$, and 0 otherwise, where $f_{max}$ is a maximum external force (we choose 0.2 kgf). We then define the relative *weakness* of a section $\Gamma_i$ by integrating $B$ over the potential force point locations on $S_i^+$:

$$W(\Gamma_i) = \int_{s \in S_i^+} \int_{2\pi} B(\Gamma, \mathbf{p}(s), \psi) d\psi ds, \qquad (4)$$

where $\mathbf{p}(s)$ is the position of force point at a surface point $s$. We approximate this costly surface integral by computing only on the sections and sampling $\psi$ at intervals $J$ (we used $J = 16$):

$$W(\Gamma_i) \simeq \frac{2\pi h}{J} \sum_{\Gamma_k \in \Gamma_i^+} \int_{s \in \Gamma_k} \sum_{j=1}^{J} B\left(\Gamma_i, \mathbf{p}(s), \frac{2\pi j}{J}\right) ds, \qquad (5)$$

We further accelerate computation by culling sections $\Gamma_k \in \Gamma_i^+$ which cannot break the cross section $\Gamma_i$. This is accomplished by computing the bounding volume of $\Gamma_k$ (we used the circumcircle as a bounding volume) and checking that the minimum breaking force $|f_{min}|$ is larger than the maximum-force threshold $f_{max}$ for all points on the section.

Weakness Heuristic 410

Print Orientation Optimization. Using the machinery described thus far, we can proceed to optimize the object orientation for printing. For a set of given normal directions $\mathbf{n}$, we slice the object at intervals $h$ and compute our weakness metric $W(\Gamma_i)$ for all sections, and then store the identified "weak" sections as $\Gamma^w := \{\Gamma_j \in \Gamma^w | W(\Gamma_j) \neq 0\}$. Once the weak cross-sections are detected, we need only to select an optimal printing direction. As we previously mentioned, objects printed with FDM are mostly likely to break between layers. Since the bending moment excites force in the direction of neutral axis $\mathbf{z}$, the object should be oriented such that $\mathbf{z}$ is as vertical as possible. Hence, we use our weakness metric to weight the neutral axis directions $\mathbf{z}_j$, corresponding to identified weak sections $\Gamma_j$, and then obtain the optimal printing direction $\Theta_{opt}$ as $$\Theta_{opt} = \arg\min_{\Theta \in \mathbb{R}^3, |\Theta|=1} \sum_{\Gamma_j \in \Gamma^w} \Theta \cdot W(\Gamma_i) \mathbf{z}_j \otimes \mathbf{z}_j \cdot W(\Gamma_i) \mathbf{z}_j \qquad (6)$$

Eqn. 6 can be solved by eigen-analysis of a 3x3 symmetric positive definite matrix $\sum_{\Gamma_j \in \Gamma^w} W(\Gamma_i) \mathbf{z}_j \otimes \mathbf{z}_j$. The smallest eigenvector gives the strongest printing direction $\Theta_{opt}$. Note that in some cases no printing direction can strengthen all weak cross sections. However we have observed that such cases are rare.

Print Orientation Heuristic 450

FIGURE 4

TECHNIQUES FOR OPTIMIZING ORIENTATION OF MODELS FOR THREE-DIMENSIONAL PRINTING

CROSS-REFERENCE TO RELATED APPLICATIONS

This application claims benefit of the U.S. Provisional Patent Application having Ser. No. 61/911,311 and filed on Dec. 3, 2013. The subject matter of this related application is hereby incorporated herein by reference.

BACKGROUND OF THE INVENTION

Field of the Invention

Embodiments of the present invention relate generally to computer science and, more specifically, to techniques for optimizing orientation of models for three-dimensional printing.

Description of the Related Art

Democratized digital manufacturing devices, such as desktop three-dimensional (3D) printers, enable non-professional users to casually create physical objects based on 3D printable digital models. To streamline the creation and optimization of 3D models, various modeling tools provide useful feedback and guidance during portions of the design process. For example, designers may use a sculpting brush in conjunction with real-time visualization of a 3D model to interactively edit the 3D model to address a highlighted concern such as overhanging regions that stress the capabilities of the 3D printer.

However, some design issues inherent in manufacturing 3D models are inadequately detected using conventional modeling tools, thereby increasing the likelihood of a user creating 3D objects that exhibit undesirable characteristics or design flaws. In particular, the manufacturing process employed by the 3D printer oftentimes introduces weaknesses into the corresponding 3D object that are not predicted by conventional modelling tools.

For example, suppose that the 3D model is to be manufactured using a 3D printer that constructs the corresponding 3D object using the Fused Deposition Method (FDM). In the FDM process, the 3D printer constructs the 3D object in layers, where each layer consists of a thin filament of melted plastic. Such a layer-by-layer construction can introduce significant structural anisotropy. In particular, vertical bonding between layers is typically much weaker than in-layer bonding. Consequently, manufacturing using FDM often infuses unacceptable weaknesses between layers in the 3D object. Current modelling tools do not provide a good way to address these issues, which can result in objects manufactured via 3D printing that are inadvertently fragile.

As the foregoing illustrates, what is needed in the art are more effective techniques for increasing the structural robustness of 3D objects when developing 3D models for 3D printing.

SUMMARY OF THE INVENTION

One embodiment of the present invention sets forth a computer-implemented method for optimizing the orientation of a three-dimensional model for three-dimensional printing. The method includes slicing the three-dimensional model to produce multiple two-dimensional cross-sections; grouping at least two of the two-dimensional cross-sections into a virtual cross-section based on connectivity characteristics of the three-dimensional model; computing a structural stress associated with the virtual cross-section based on bending moment equilibrium; applying a weakness heuristic to the structural stress to determine a weakness metric for the virtual cross-section; and based on the weakness heuristic and an orientation of the virtual cross-section, selecting a printing orientation for the three-dimensional model.

One advantage of the disclosed printing orientation optimization techniques is that these techniques automatically and efficiently mitigate undesirable weaknesses imbued into the 3D object by the manufacturing process. In particular, selecting the identified optimal printing direction for 3D printers that implement the Fused Deposition Method reduces the fragility between manufactured layers by orienting weak areas along the axis of the print bed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and payment of the necessary fee.

FIG. 3 depicts various heuristics implemented within the stress analysis engine of FIG. 1, according to one embodiment of the present invention;

FIG. 4 depicts various heuristics implemented within the print orientation analysis tool of FIG. 1, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
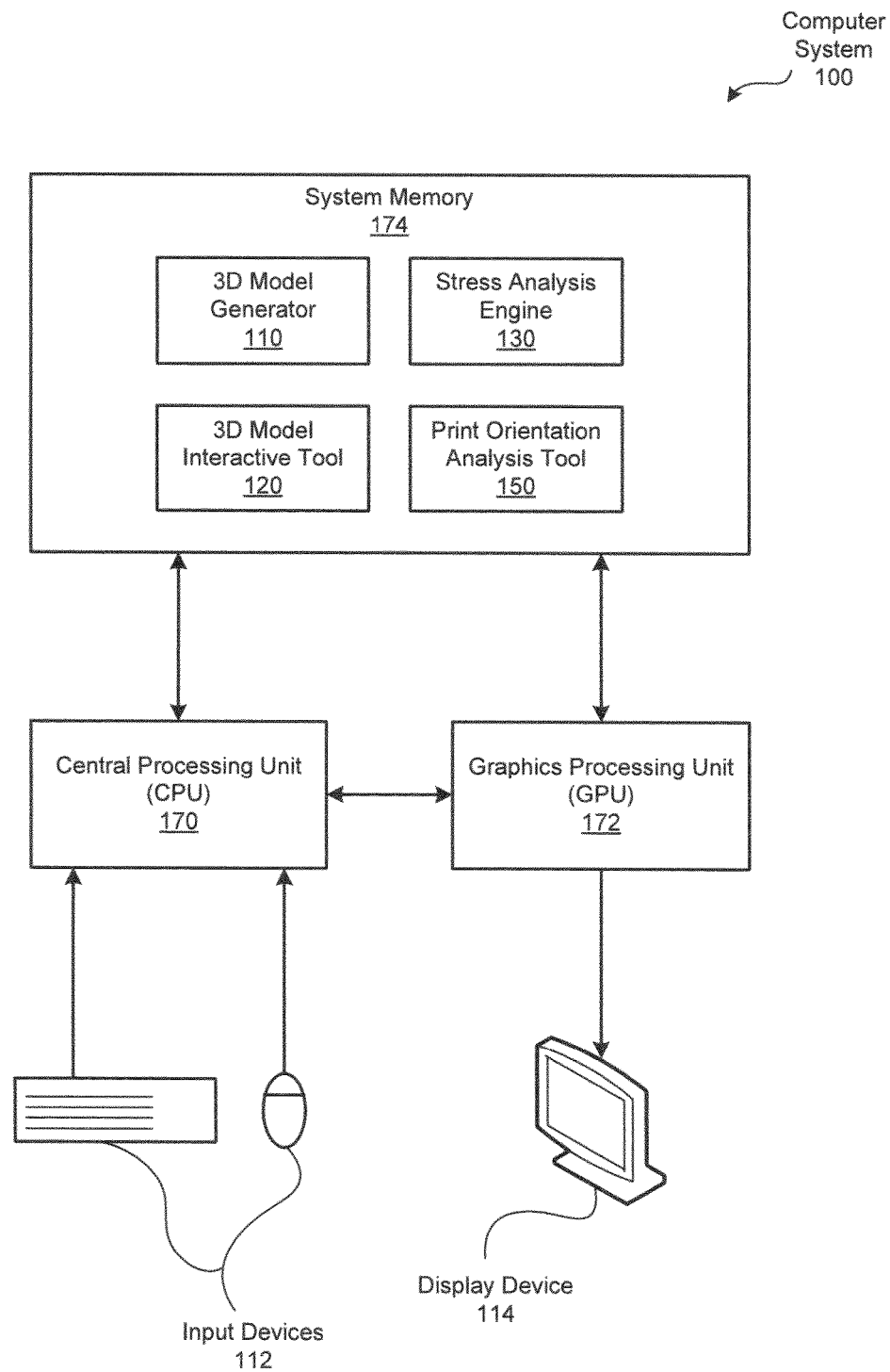
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 170, a system memory 174, a graphics processing unit (GPU) 172, input devices 112, and a display device 114.

The CPU 170 receives input user information from the input devices 112, such as a keyboard or a mouse. In operation, the CPU 170 is the master processor of the computer system 100, controlling and coordinating operations of other system components. In particular, the CPU 170 issues commands that control the operation of the GPU 172. The GPU 172 incorporates circuitry optimized for graphics and video processing, including, for example, video output circuitry. The GPU 172 delivers pixels to the display device 114 that may be any conventional cathode ray tube, liquid crystal display, light-emitting diode display, or the like. In various embodiments, GPU 172 may be integrated with one or more of other elements of FIG. 1 to form a single system. For example, the GPU 172 may be integrated with the CPU 170 and other connection circuitry on a single chip to form a system on chip (SoC).

The system memory 174 stores software content, such as software applications and data, for use by the CPU 170 and the GPU 172. As shown, the system memory 174 includes a 3D model generator 110, a 3D model interactive tool 120, a stress analysis engine 130, and a print orientation analysis tool 150. The 3D model generator 110, the 3D model interactive tool 120, the stress analysis engine 130, and the print orientation analysis tool 150 are software applications that execute on the CPU 170, the GPU 172, or any combination of the CPU 170 and the GPU 172. The 3D model generator 110, the 3D model interactive tool 120, the print orientation analysis tool 150, and the 3D stress analysis engine 130 facilitate 3D printing.

In operation, the 3D model generator 110 enables specification of a 3D model 205 that describes a 3D object. The 3D model generator 110 may be implemented in any technically feasible fashion. For instance, the 3D model generator 110 may include computer aided design (CAD) software. Such CAD software often includes a graphical user interface that converts designer input such as symbols and brush stroke operations to geometries in the 3D model. Alternatively, the 3D model generator 110 may be a 3D scanner that analyzes an existing 3D solid object to create the 3D model as a digital template for creation of copies of the existing 3D solid object.

The 3D model may conform to any 3D printable format as known in the art. For instance, in some embodiments the 3D model may capture unit normal and vertices that define the 3D solid object in the stereolithograpy format. In alternate embodiments, the 3D model may capture a 3D mesh of interconnected triangles that define the 3D solid object in the collaborative design activity (COLLADA) format. In alternate embodiments, the 3D model is created manually and the 3D model generator 110 is not included in the computer system 100.

The 3D model generator 110 is coupled to the 3D model interactive tool 120. This coupling may be implemented in any technically feasible fashion, such as exporting the 3D model from the 3D model generator 110 and then importing the 3D model to the 3D model interactive tool 120. The 3D model interactive tool 120 is configured to receive designer input information from the input devices 112. After the 3D model interactive tool 120 processes the designer input information in conjunction with the 3D model, the 3D model interactive tool 120 delivers pixels to the display device 114. The 3D model interactive tool 120 is configured to continuously repeat this cycle, enabling the designer to dynamically interact with the 3D model based on real-time images on the display device 110.

The stress analysis engine 130 performs real-time stress analysis for the 3D model based on applying bending moment equilibrium to cross-sections of the 3D model. The stress analysis engine 130 provides combinations of cross-sections and structural stresses to the print orientation analysis tool 150. The print orientation analysis tool 150 converts the structural stresses to weakness metrics. Based on these weakness metrics and the orientation of the cross-sections, the print orientation analysis tool 150 determines an orientation for the 3D model that optimizes the structural robustness of the corresponding 3D object when manufactured with a 3D printer.

In some embodiments, the 3D model interactive tool 120 enhances an image of the 3D model 205 on the display device 114 based on the combinations of virtual cross-sections and weakness metrics and/or the optimized printing orientation. The 3D model interactive tool 120 may enhance the model in any technically feasible fashion. For instance, the 3D model interactive tool 120 may display an up arrow to convey the optimized up direction with respect to the print plane of the 3D printer. Further, in some embodiments, the 3D model interactive tool 120 may overlay an image of the 3D model with a color map of weaknesses, where a blue color depicts cross-sections of the model associated with low structural weakness and a red color depicts cross-sections of the model associated with high structural weakness. In alternate embodiments, the print orientation analysis tool 150 may provide weakness and/or orientation data in any format and to any application configured to consume the data.

In alternate embodiments, the 3D model generator 110, the 3D model interactive tool 120, the stress analysis engine 130, and/or the print orientation analysis tool 150 are integrated into any number (including one) of software applications. In other embodiments, the system memory 174 may not include the 3D model generator 110, the 3D model interactive tool 120, the stress analysis engine 130, and/or the print orientation analysis tool 150. In some embodiments, the stress analysis engine 130, and/or the print orientation analysis tool 150 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, software applications illustrated in computer system 100 may execute on distributed systems communicating over computer networks including local area networks or large, wide area networks, such as the Internet. Notably, the print orientation analysis tool 150 described herein is not limited to any particular computing system and may be adapted to take advantage of new computing systems as they become available.

It will be appreciated that the computer system 100 shown herein is illustrative and that variations and modifications are possible. The number of CPUs 170, the number of GPUs 172, the number of system memories 174, and the number of applications included in the system memory 174 may be modified as desired. Further, the connection topology between the various units in FIG. 1 may be modified as desired.

Optimizing Orientation for 3D Printing

Figure 2:
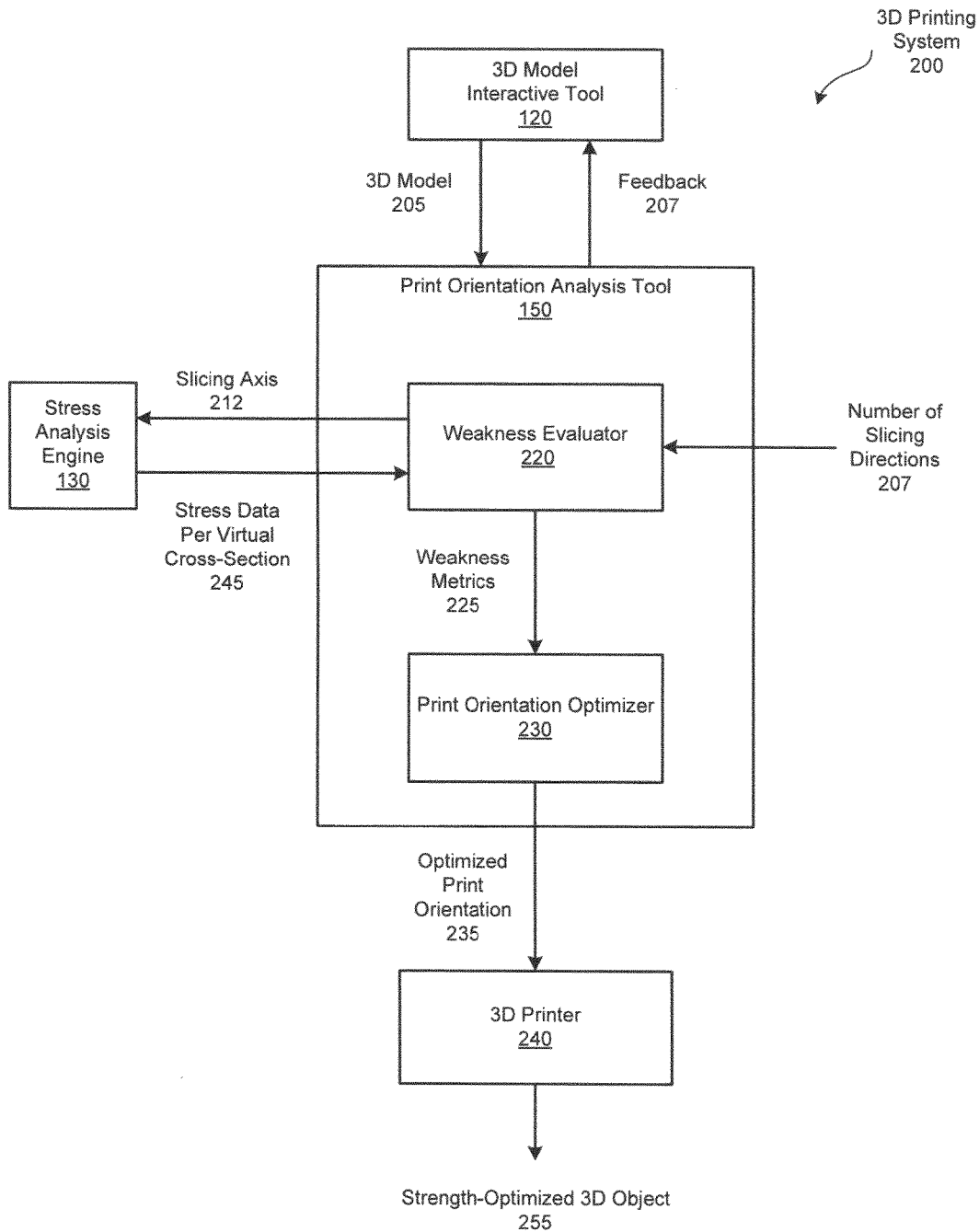
FIG. 2 is a block diagram illustrating a three-dimensional (3D) printing system controlled by the computer system of FIG. 1 and configured to implement one or more aspects of the present invention.

FIG. 2 is a block diagram illustrating a three-dimensional (3D) printing system 200 controlled by the computer system 100 of FIG. 1 and configured to implement one or more aspects of the present invention. The 3D printing system 200 includes, without limitation, the 3D model interactive tool 120, the stress analysis engine 130, the print orientation analysis tool 150, and a 3D printer 240. As shown in FIG. 1, the 3D model interactive tool 120, the stress analysis engine 130, and the print orientation analysis tool 150 are included in the system memory 174 of the computer system 100 and execute on the CPU 170 and/or the GPU 172.

In general, the 3D model interactive tool 120, the stress analysis engine 130, and the print orientation analysis tool 150 enable the user to efficiently create and fine-tune 3D model 205 from which the 3D printer 250 generates 3D objects. In particular, the 3D printing system 200 leverages knowledge of the manufacturing process implemented by the 3D printer 240 to guide the user throughout the process of developing a strength-optimized 3D object 255.

The 3D printer 240 may be configured to build-up any type of 3D object in any technically feasible fashion. For instance, in some embodiments, the 3D printer 240 extrudes plastic, and the 3D printer 240 may be configured to print plastic replacement parts for tools based on blueprints expressed as 3D models 205. In other embodiments, the 3D printer 240 generates live cells, and the 3D printer 240 may be configured to print organs, such as kidneys.

Typically, the manufacturing process implemented by the 3D printer 240 influences the structural integrity of the generated 3D objects. For example, suppose the 3D printer 240 is configured to construct 3D objects using the Fused Deposition Method (FDM). This layer-by-layer design process introduces a significant structural anisotropy into the 3D object. In particular, vertical bonding between layers is much weaker than in-layer bonding, and, consequently, manufacturing using FDM infuses weaknesses between layers in the 3D object. Advantageously, the 3D printing system 200 provides user-friendly techniques to identify areas of unacceptable weakness attributable to the 3D printing process. Further, the 3D printing system facilitates mitigation strategies that enable the user to produce the strength-optimized 3D object 255.

In operation, when the user updates the 3D model 205 via the 3D model interactive tool 120, the 3D model interactive tool 120 sends the 3D model 205 to the print orientation analysis tool 150. As shown, the print orientation analysis tool 150 includes a weakness evaluator 220 and a print orientation optimizer 230. Upon receiving the 3D model 205, the weakness evaluator 220 performs a multi-direction cross-sectional stress analysis of the 3D model 205. Notably, the weakness evaluator 220 leverages the stress analysis engine 130 to perform independent cross-sectional evaluations at a configurable number of slicing directions 207. More specifically, for the number of slicing directions 207, the weakness evaluator 220 configures the stress analysis engine 130 to create and process cross-sections along a different slicing axis 212.

Each slicing axis 212 is a consistent, single direction that may be selected in any technically feasible fashion. In some embodiments, each slicing axis 212 is selected arbitrarily. In other embodiments, any technically feasible heuristic may be employed to select the slicing axes 212. For example, a heuristic based on geometric analysis of the 3D model 205 may select a set of slicing axes 212 that are distributed at equal interval across a span of angles.

In general, as the number of cross-sections generated and evaluated increases, both the accuracy of the corresponding stress analysis and the time required to perform the stress analysis also increase. Accordingly, the quality of the stress analysis correlates to both to the number of slicing directions 207 and the thickness of each slice. Advantageously, the print orientation analysis tool 150 selects the number of slicing directions 207 and/or the thickness of each slice to trade-off between calculation time and accuracy. To enable real-time feedback, the print orientation analysis tool 150 selects a relatively small number of slicing directions 207 and/or a relatively large slicing thickness. To obtain more accurate results, the print orientation analysis tool 150 selects a relatively large number of slicing directions 207 and/or a relatively small slicing thickness.

For each selected slicing axis 212, the stress analysis engine 130 slices the 3D model 205 at intervals of the slicing thickness into layers of two-dimensional cross-sections. Each layer may contain multiple disjoint cross-sections and the distribution of forces depends on the boundary conditions (i.e., where the 3D object is fixed and where the external force is applied). To accurately model the relationship between cross-sections in each layer, the stress analysis engine 130 clusters the cross-sections into groups of cross-sections based on connectivity characteristics. Within each group, the disjoint cross-sections collectively influence the distribution of an external force applied to the 3D model 205 when the 3D model 205 is fixed at a selected location.

After distributing the cross-sections into groups of one or more cross-sections, the stress analysis engine 130 constructs a per-group virtual cross-section and corresponding neutral axis that are amenable to analysis based on the Euler-Bernoulli assumption (conventionally applied to beams). For each virtual cross-section and corresponding neutral axis direction, the stress analysis engine 130 determines internal bending moments and external bending moments. The stress analysis engine 130 then applies bending moment equilibrium based-techniques to compute stress data per virtual cross-section 245, such as the maximum stress on each virtual cross-section. The stress analysis engine 130 then sends the resulting combinations of virtual cross-sections and stress data per virtual cross-section 245 to the weakness evaluator 205. In alternate embodiments, the stress data per virtual cross-section 245 may be consumed by other applications, such as a graphical user interface (included in the 3D model interactive tool 120) that displays a visualization of the 3D model 205 annotated with areas of critical stress.

After receiving the stress data per virtual cross-section 245, the weakness evaluator 220 applies a weakness heuristic to the stress data per virtual cross-section 245, generating weakness metrics 225. The structural weakness heuristic evaluates the structural weakness across a virtual cross-section based on both the magnitude of force required to break the virtual cross-section and the area over which the force is distributed. The weakness evaluator 220 may apply any technically feasible weakness heuristic to the virtual cross-sections 245.

For instance, in some embodiments, the weakness evaluator 220 generates a breakage function that indicates the relative ease with which a virtual-cross section can be broken based on the stress data per virtual cross-section 245. Subsequently, the weakness evaluator 220 integrates this breakage function over the potential applied force point locations to compute the relative weakness of the virtual cross-section. To expedite the weakness computations in some embodiments, the weakness evaluator 220 culls applied force locations—bypassing one or more calculations for force locations at which the maximum applied force is less than the minimum breakage force.

The print orientation optimizer 230 receives the weakness metrics 225 and determines an optimized print orientation 235. The optimized print orientation 235 is the orientation of the 3D model 205 with respect to the print bed of the 3D printer 240 for which the strength of the manufactured 3D object is maximized. In general, the print orientation optimizer 230 determines the optimized print orientation 235 based on the weakness metrics 225 and the orientation of the corresponding virtual cross sections. However, the specific print orientation heuristic implemented by the print orientation optimizer 230 is tailored to the construction process executed by the 3D printer 240.

For instance, 3D objects printed with FDM typically break between manufacturing layers. Consequently, for FDM-based 3D printing systems 200, the bending moment excites force in the direction of the neutral axis of each virtual cross-section. Accordingly, to strengthen the manufactured 3D object, the print orientation optimizer 230 selects the optimized print orientation 235 to maximize the vertical alignment of the neutral axes corresponding to relative weak virtual cross-sections.

In operation, the print orientation optimizer 230 selects one or more "weak" virtual cross-sections based on the weakness metrics 225. After selecting these weak virtual cross-sections, the print orientation optimizer 230 weights the neutral axis direction of each weak virtual cross-section with the corresponding weakness metric 225. The print orientation optimizer 230 then solves for the optimized "up" direction that minimizes the combination of these weighted directions. This optimized "up" direction defines the orientation of the 3D model 205 that configures the 3D printer 240 to generate the strength-optimized D object 255.

As shown, the print orientation analysis tool 150 provides feedback 207 to the 3D model interactive tool 120. The feedback 207 may include any type and form of data that the 3D model interactive tool 120 uses to provides information and/or guidance to the user. In some embodiments, the feedback 207 includes the weakness metrics 225 and the optimized print orientation 235. Advantageously, the feedback 207 enables the user to iteratively fine-tune the 3D model based on the weakness metrics 225 to increase the structural strength of the manufactured 3D model. Further, the feedback 207 enables the 3D model interactive tool 120 to convey the optimized print orientation 235 to the user in an intuitive manner, such as displaying an "up" arrow superimposed on an image of the 3D model 205.

In alternate embodiments, the stress analysis engine 130 may compute and communicate structural stress data to the weakness evaluator 220 in any technically feasible fashion. In some embodiments the stress analysis engine 130 performs cross-sectional stress analysis on each cross-section and omits identifying and constructing virtual cross-sections. In such embodiments, the functionality within the print orientation analysis tool 150 is modified to operate at the granularity of cross-sections instead of virtual cross-sections.

In general, based on one or more selected cross-sections or virtual cross-sections, a desired force position, and a force direction, the weakness evaluator 220 may compute any type of weakness metrics 225. The print-orientation optimizer 230 may then leverage the weakness metrics 225 to determine the optimized print orientation 235 for a specific purpose. For instance, the print orientation optimizer 230 may be configured to determine a print direction that increases the ability of the 3D object to withstand a user-specified force at a user-specified point included in the 3D model 205.

FIG. 3 depicts various heuristics implemented within the stress analysis engine 130 of FIG. 1 according to one embodiment of the present invention. As shown, the stress analysis engine 130 implements a virtual cross-section heuristic 310, an external bending moment heuristic 350, an internal bending moment heuristic 360, and a moment equilibrium heuristic 370.

The stress analysis techniques described herein are illustrative rather than restrictive, and may be modified to reflect various implementations without departing from the broader spirit and scope of the invention. Embodiments of the current invention include any techniques that provide cross-sectional structural stress data for 3D models 205 to the print orientation optimizer 230. Further, the functionality may be distributed in any manner between any number of units. For example, in some embodiments, the functionality of the stress analysis engine 130 is combined with the functionality of the weakness evaluator 220 into a single component within the print orientation analysis tool 150.

FIG. 4 depicts various heuristics implemented within the print orientation analysis tool 150 of FIG. 1, according to one embodiment of the present invention. More specifically, the weakness evaluator 220 implements a weakness heuristic 410 and the print orientation optimizer 230 implements a print orientation heuristic 450.

The weakness analysis and orientation optimization techniques described herein are illustrative rather than restrictive, and may be modified to reflect various implementations without departing from the broader spirit and scope of the invention. Embodiments of the current invention include any techniques that enable weakness analysis and/or orientation optimization for 3D models 205. Further, the functionality may be distributed in any manner between any number of units. For example, in some embodiments, the functionality of weakness evaluator 220 is combined with the functionality of the print orientation optimizer into a single component within the print orientation analysis tool 150.

Figure 5:
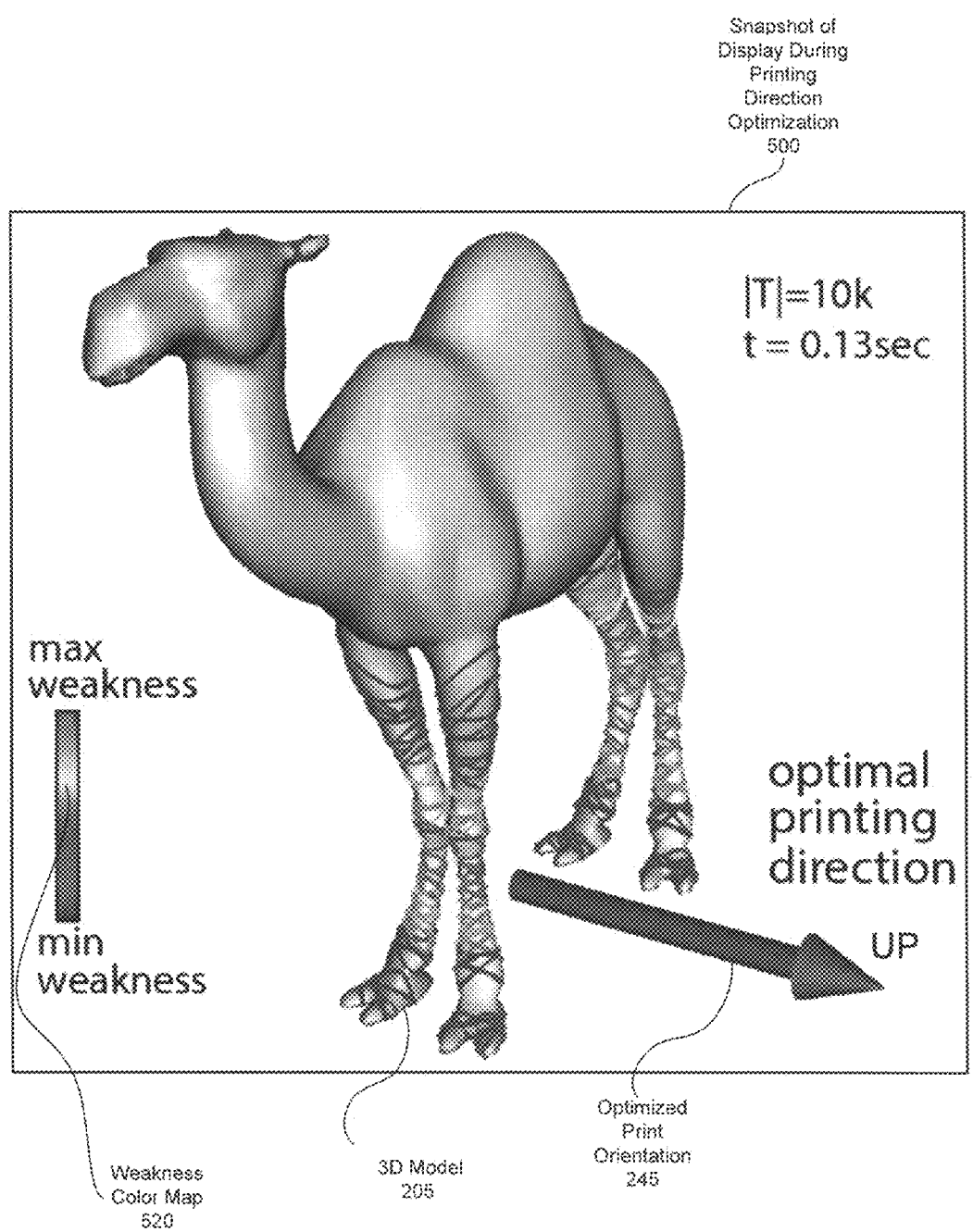
FIG. 5 is a conceptual illustration of the three-dimensional (3D) model of FIG. 2 overlaid with weakness-related information and an optimized 3D printing up direction, according to one embodiment of the present invention.

FIG. 5 is a conceptual illustration of the three-dimensional (3D) model 205 of FIG. 2 overlaid with weakness-related information and an optimized 3D printing up direction, according to one embodiment of the present invention. The context of FIG. 5 is that a designer is using the 3D model interactive tool 120 to observe weakness analysis data and determine the optimal print direction for the 3D model 205. The 3D model interactive tool 120 and the print orientation analysis tool 150 are coupled in a manner that is transparent to the designer. However, for discussion purposes, the designer has selected a print orientation optimization mode that configures the 3D model interactive tool 120 to invoke the print orientation analysis tool 150 and display the resulting data in real-time.

As shown, a "snapshot of display during printing direction optimization" 500 visually depicts the 3D model 205 of a camel. Based on a weakness color map 520 and combinations of virtual cross-sections and weakness metrics 225 provided by the print orientation analysis tool 150, the 3D model interactive tool 120 overlays the 3D model 205 with intuitively presented weakness information. In particular, based on the weakness color map 520, the 3D model interactive tool 120 displays virtual cross-sections associated with maximum weakness metrics 225 in red. After the print orientation analysis tool 150 computes the optimized print orientation 245, the 3D model interactive tool 120 displays a red arrow annotated with "optimal printing direction."

Although not shown, based on the weakness information, the designer may invoke a sculpting brush to increase the amount of material in regions of max weakness (depicted in red). As the designer reinforces the 3D model 205, the 3D model interactive tool 120 works in conjunction with the print orientation analysis tool 150 to dynamically update both the weakness information and the optimized print orientation 245. As previously disclosed herein, the print orientation analysis tool 150 will invoke the stress analysis engine 130 across one or more slicing axis 212 as part of re-calculating the weakness information. In this fashion, the designer may interactively reinforce the 3D model 205 in an informed manner.

In general, the 3D model interactive tool 120 may overlay and/or annotate the displayed image in any technically feasible fashion and with any type of data. For example, the snapshot of the display during printing direction optimization 500 includes the annotations"|T|=10 k" and "t=0.13 sec," where |T| is the triangle count, and t is the total time taken to compute the optimized print orientation 245. Often 3D models 205 include significantly more than 10,000 triangles.

Notably, the level of accuracy using the cross-sectional analysis methods disclosed herein correlates to the number of cross-sections evaluated in the 3D model 205. Consequently, increasing the number of slicing axes 212 and/or decreasing the width of the slices, increases the accuracy of the cross-sectional analysis. To fine-tune the optimized print orientation 234 to maximize the strength of the 3D model 205 typically requires the evaluation of hundreds of thousands of cross-sections. Without the efficiency exhibited by the stress analysis engine 130 and the print orientation analysis tool 150, constructive weakness analysis and corresponding printing direction optimization would be prohibitively slow. Consequently, manually determining the optimized print orientation 235 is unrealistic.

Figure 6A:
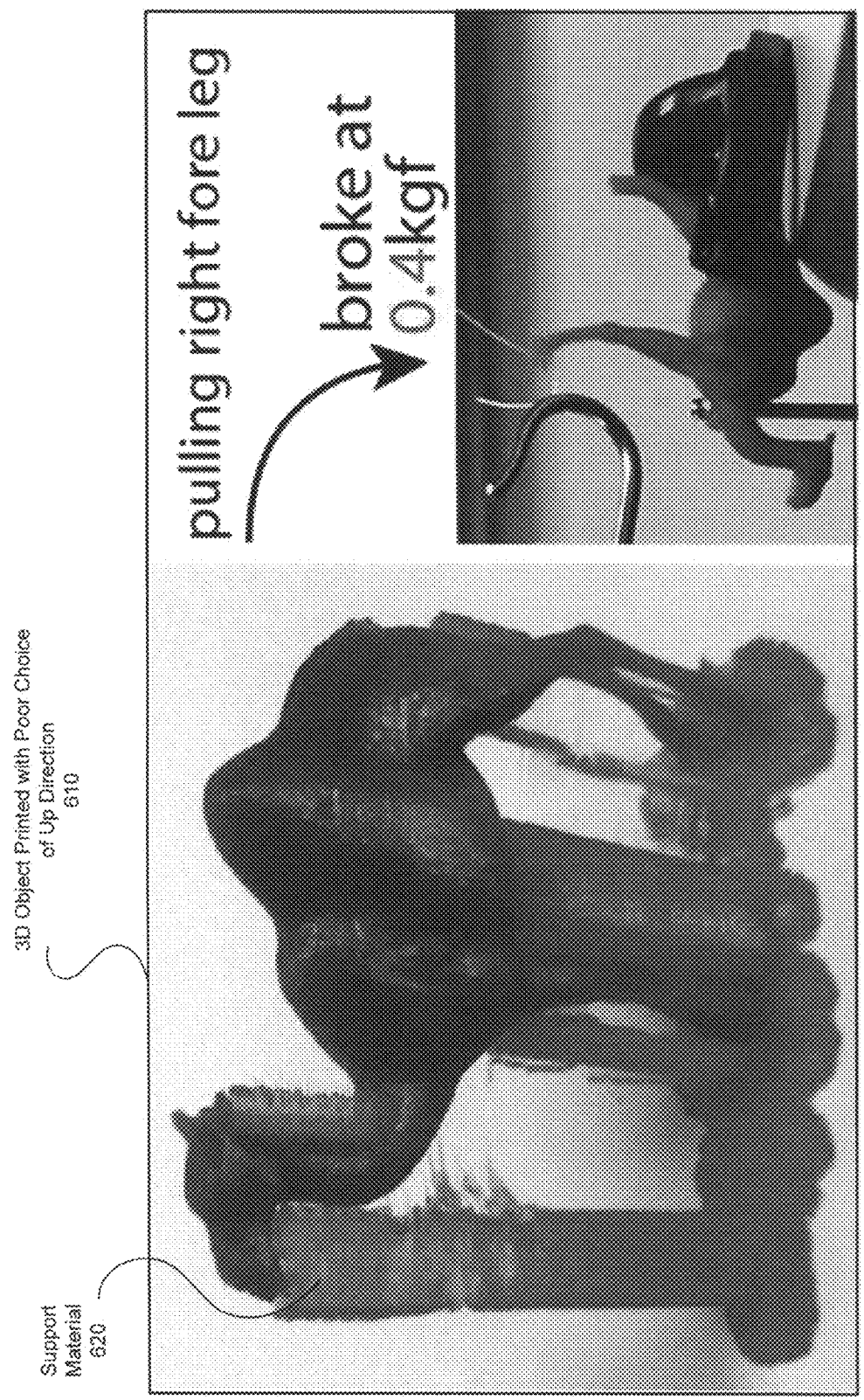
FIGS. 6A and 6B are conceptual illustrations of the three-dimensional (3D) objects generated before and after the 3D model is oriented to the optimized 3D printing up direction of FIG. 5, according to one embodiment of the present invention.
Figure 6B:
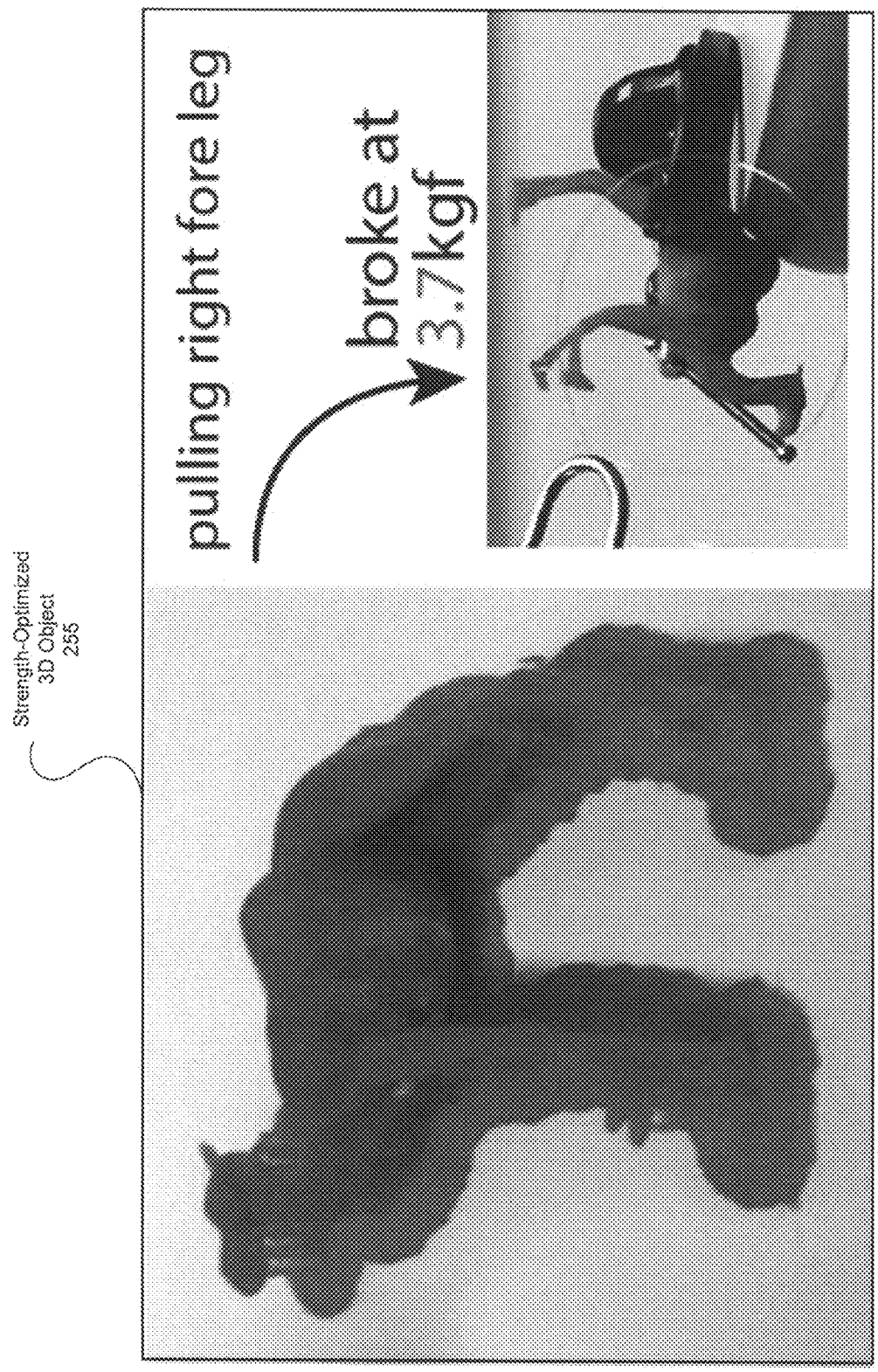

FIGS. 6A and 6B are conceptual illustrations of the three-dimensional (3D) objects generated before and after the 3D model 205 is oriented to the optimized print orientation 235 of FIG. 2, according to one embodiment of the present invention. The context of FIGS. 6A and 6B is that the 3D printer 240 included in the 3D printing system 200 employs Fused Deposition Method (FDM) to manufacture 3D objects from 3D models 205. In the FDM process, the 3D object is manufactured in a series of horizontal layers and, consequently, the vertical bonding between horizontal layers is much weaker than in-layer bonding. Both the weakness heuristic 410 and print orientation heuristic 450 included in the print orientation analysis tool 150 reflect the structural anisotropy introduced by the 3D printer 240.

Initially, a designer manufactures a "3D object printed with poor choice of up direction" 610 from the 3D model 205 of the camel depicted in FIG. 5. Notably, the designer orients the 3D model 205 with the camel upright and perpendicular to the print bed. In operation, the 3D printer 240 creates the 3D object starting from the print bed and proceeding upwards. To avoid subsequent un-supported layers (such as the head of the camel) collapsing and/or drooping onto proceeding layers or the ground due to gravity during the printing process, the 3D printer 240 includes support material 620. As shown in FIG. 6A, the "3D object printed with poor choice of up direction" 610 includes a significant amount of support material 620, indicating a large percentage of poorly-supported regions in this unenlightened orientation.

After generating the "3D object printed with poor choice of up direction" 610, the user tests the strength. As shown in FIG. 6A, the user fixes the rear of the camel and pulls on the right fore leg—increasing the force until the right fore leg breaks away from the remainder of the camel. The right fore leg of the camel breaks at an applied force of 0.4 kgf.

Because the user desires a less fragile camel, the user invokes the print orientation analysis tool 150 to determine the optimized print orientation 245. As depicted in FIG. 5, the print orientation analysis tool 150 determines that the optimized printed orientation 235 is with the camel "lying down" and parallel to the print bed. The result of orienting the 3D model 205 of the camel in the optimized print orientation 245 is the strength-optimized 3D object 255.

The user then fixes the rear of the strength-optimized camel and pulls on the right fore leg—increasing the force until the right fore leg breaks away from the remainder of the strength-optimized 3D camel. As shown in FIG. 6B, the right fore leg of the strength-optimized camel breaks in response to an applied force of 3.7 kgf. As previously noted herein, the right fore leg of the camel printed with a poorly chosen orientation breaks at 0.4 kgs, dramatically illustrating the impact of the printing orientation on the strength of the manufactured 3D object.

Figure 7:
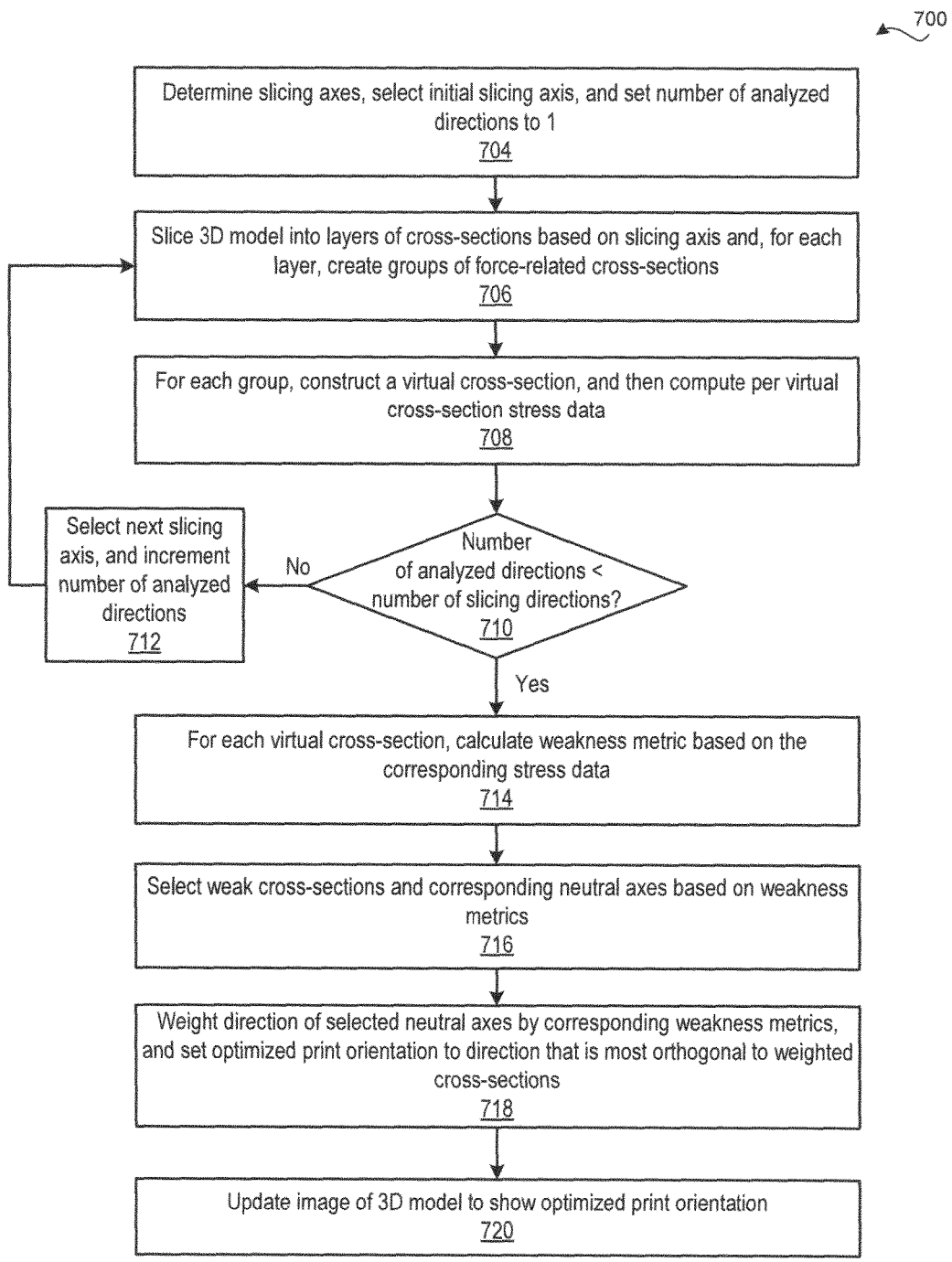
FIG. 7 is a flow diagram of method steps for determining the optimal orientation of a 3D model during 3D printing, according to one embodiment of the present invention.

FIG. 7 is a flow diagram of method steps for determining the optimal orientation of a 3D model during 3D printing, according to one embodiment of the present invention. Although the method steps are described with reference to the systems of FIGS. 1-6, persons skilled in the art will understand that any system configured to implement the method steps, in any order, falls within the scope of the present invention.

As shown, a method 700 begins at step 704, where the weakness evaluator 220 included in the print orientation optimization tool 150 receives the 3D model 205 for evaluation. The weakness evaluator 220 also receives the number of slicing directions 207 and a slicing thickness for cross-sectional stress analysis. Together, the number of slicing directions 207 and the slicing thickness determine the number of cross-sections evaluated and, consequently, influence both the accuracy and the execution time of the print orientation analysis tool 150. In alternate embodiments the number of slicing direction 207 and/or the slicing thickness may default to any predetermined value.

As part of step 704, the weakness evaluator 220 selects the slicing axis 212 for each of the number of slicing directions 207. The weakness evaluator 220 may select this set of slicing axes 212 in any technically feasible fashion. In some embodiments, the weakness evaluator 220 selects a set of slicing axes 212 that uniformly span a range of angles corresponding to expected directions of forces exerted on the 3D model 205. The weakness evaluator 220 then initializes a number of directions analyzed to 1, and selects the first slicing axis 212 included in the selected set of slicing axes 212.

At step 706, the weakness evaluator 220 configures the stress analysis engine 130 to perform structural stress analysis of the 3D model 205 based on cross-sections parallel to the selected slicing axis 212. The stress analysis engine 130 divides the 3D model 205 into equally spaced layers that are oriented parallel to the selected slicing axis 212 and are of the slice thickness, and then generates cross-sections for each layer. Advantageously, since both the slicing axis 212 and the slicing thickness are configurable, the stress analysis engine 130 may be tuned to reflect various constraints and/or tradeoffs, such as computational speed or accuracy of the stress analysis. For each layer, the stress analysis engine 130 then identifies groups of disjointed cross-sections in which the distribution of forces are influenced by multiple cross-sections in the layer 215. The stress analysis engine 130 may distribute the cross-sections included in each of the layers across the groups in any technically feasible fashion that reflects force distribution across the layer.

At step 708, for each group, the stress analysis engine 130 constructs a virtual cross-sections and corresponding neutral axes. The stress analysis engine 130 may construct the each of the virtual cross-sections in any technically feasible fashion that ensures the neutral axis is perpendicular to the virtual cross-section and passes through the centroid of the virtual cross-section. In some embodiments, the stress analysis engine 130 implements the virtual cross-section heuristic 310 depicted in FIG. 3.

The stress analysis engine 130 estimates the stress data per virtual cross-section 245 based on applying the EB assumption to the combinations of virtual cross-sections and neutral axes. In alternate embodiments, the stress analysis engine 130 may compute the cross-sectional stress based on applying bending moment equilibrium in any technically feasible fashion. For example, in some embodiments, the stress analysis engine 130 implements the external bending moment heuristic 350, the internal bending moment heuristic 360, and the moment equilibrium heuristic 370 depicted in FIG. 3. The stress analysis engine 130 then communicates the stress data per virtual cross-section 245 (for the selected slicing axis 212) to the weakness evaluator 220.

At step 710, if the weakness evaluator 220 determines that the number of analyzed slicing directions is less than the number of slicing directions 207, then the method 700 proceeds to step 712. At step 712, the weakness evaluator 220 selects the next slicing axis 212 included in the selected set of slicing axes 212 and increments the number of directions analyzed. The method 700 returns to step 706, where the weakness evaluator 220 generates new cross-sections, groups the new cross-sections into new virtual cross-sections, and computes corresponding stress data per virtual cross-section 245 for the new virtual cross-sections. The weakness evaluator 220 and the stress analysis engine 130 continue to execute steps 706-712, computing stress data per virtual cross-section 245 for slicing axes 212, until the number of analyzed slicing directions equals the specified number of slicing directions 207.

If, at step 710, the stress analysis engine 130 determines that the number of analyzed slicing directions equals the number of slicing directions 207, then the method 700 proceeds directly to step 714. At step 714, for the stress data per virtual cross-section 245 across the complete set of slicing axes 212, the weakness evaluator 220 calculates corresponding weakness metrics 225. The weakness evaluator 220 may compute the weakness metrics 225 in any technically feasible fashion that reflects the structural weakness across each virtual cross-section based on both the magnitude of force required to break the virtual cross-section and the area over which the force is distributed. In some embodiments, the weakness evaluator 220 implements the weakness heuristic 410 depicted in FIG. 4.

At step 716, the print orientation optimizer 230 selects one or more "weak" virtual cross-sections based on the weakness metrics 225. The print orientation optimizer 230 may select any number of weak virtual cross-sections in any technically feasible fashion. The print orientation optimizer 230 may select a single weak virtual cross-section that reflects the weakest weakness metric 225. Alternatively, the print orientation optimizer 230 may select all the virtual cross-sections across all the slicing axes 223. In some embodiments, the print orientation optimizer 230 selects the virtual cross-sections corresponding to weakness metrics 225 that are weaker than a pre-determined critical weakness. As part of step 716, the print orientation optimizer 230 also selects the neutral axis of each of the selected "weak" virtual cross-sections.

At step 718, the print orientation optimizer 230 weights the neutral axis direction of each weak virtual cross-section with the corresponding weakness metric 225. The print orientation optimizer 230 then solves for the direction that is most orthogonal to the weighted directions—minimizing the combination of these weighted directions. The print orientation optimizer 230 may solve for the optimized direction in any technically feasible fashion. In some embodiments, the print orientation optimizer 230 implements the print orientation heuristic 450. In alternate 3D printing systems 200, the print orientation analysis tool 150 may be configured to determine the optimized print orientation 235 based on cross-sectional stress analysis in any technically feasible fashion to reflect any type of manufacturing weakness injected by any type of 3D printer.

At step 720, the print orientation optimizer 230 communicates the weakness metrics 225 and/or the optimized print orientation 235 to the 3D model interactive tool 120 as the feedback 207. Based on the feedback 207, the 3D model interactive tool 120 superimposes weakness and print orientation information on an image of the 3D model 205 displayed on the display device 114.

In some embodiments, the 3D printing system 200 is configured to continuously repeat the method 700 as the user interactively updates the 3D model 205. After the user is satisfied with the displayed weakness information, the 3D printer 240 is configured to print the 3D model 205 in the optimized print orientation 215, thereby generating the strength-optimized 3D object 255.

In sum, the disclosed techniques may be used to efficiently optimize the orientation of models to compensate for structural weaknesses that are introduced during the 3D printing manufacturing process. For layer-based manufacturing processes, a weakness evaluator configures a stress analysis tool to generate combinations of cross-sections and maximum stresses across a variety of cross-sectional slicing axes. The weakness evaluator then applies a structural weakness heuristic that translates the stresses into corresponding weakness metrics. Subsequently, for each combination, the print orientation optimizer weights a normal axis of the cross-sections included in the combination with the corresponding weakness metric. To compensate for weaknesses between manufactured horizontal layers, the print orientation optimizer sets the optimized printing "up" direction to the direction that is most orthogonal to the weighted cross-sections.

Advantageously, selecting the optimal printing orientation for a 3D model significantly increases the likelihood of a 3D printer generating a structurally robust corresponding 3D object. When printing with the Fused Deposition Method, orienting the 3D model to the optimized printing "up" direction minimizes the stress between fabricated layers, increasing the force required to break the resulting 3D object. Further, the cross-sectional weakness computations may be incorporated into interactive design tools that allow designers to fine-tune the 3D model based on a dynamically updated "best" up direction and the cross-sectional weaknesses. Notably, the user may leverage real-time weakness feedback to guide sculpting the 3D model to reinforce unacceptable fragile regions. The user may then orient the reinforced 3D model on the print bed based on the printing "up" direction, further strengthening the manufactured 3D object.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for optimizing the orientation of a three-dimensional model for three-dimensional printing, the method comprising:
    slicing the three-dimensional model to produce multiple two-dimensional cross-sections;
    grouping at least two of the two-dimensional cross-sections into a first virtual cross-section based on connectivity characteristics of the three-dimensional model;
    computing a first structural stress associated with the first virtual cross-section based on bending moment equilibrium;
    applying a weakness heuristic to the first structural stress to determine a weakness metric for the first virtual cross-section; and
    based on the weakness heuristic and an orientation of the first virtual cross-section, selecting a printing orientation for the three-dimensional model.

2. The method of claim 1, wherein selecting the printing orientation comprises:
    weighting a direction associated with a neutral axis of the first virtual cross-section based on the weakness metric for the first virtual cross-section to produce a first weighted direction;
    weighting a direction associated with a neutral axis of a second virtual cross-section based on a weakness metric for the second virtual cross-section to produce a second weighted direction; and
    setting the printing orientation to a direction most orthogonal to the first weighted direction and the second weighted direction.

3. The method of claim 1, wherein selecting the printing orientation comprises:
    comparing the weakness metric for the first virtual cross-section to a weakness metric for a second virtual cross-section; and
    if the weakness metric for the first virtual cross-section is greater than the weakness metric for the second virtual cross section, then indicating that a direction associated with a neutral axis of the first virtual cross-section is a weakest direction, or
    if the weakness metric for the first virtual cross-section is not greater than the weakness metric for the second virtual cross section, then indicating that a direction associated with a neutral axis of the second virtual cross-section is a weakest direction; and setting the printing orientation to a direction orthogonal to the weakest direction.

4. The method of claim 1, wherein the connectivity characteristics indicate that the at least two of the two-dimensional cross sections collectively influence the distribution of an external force applied to the three-dimensional model when the three-dimensional object is fixed at a first location.

5. The method of claim 1, wherein computing the first structural stress comprises:
selecting a neutral axis based on each of the two-dimensional cross-sections included in the first virtual cross-section; and
applying bending moment equilibrium to the virtual cross-section based on the neutral axis.

6. The method of claim 1, further comprising, prior to slicing the three-dimensional model, selecting a first number of slicing axes, wherein each slicing axis is orthogonal to a potential printing orientation, and the number of slicing axes satisfies an accuracy constraint.

7. The method of claim 1, further comprising superimposing at least one of the weakness metric and the printing orientation on the three-dimensional model for display.

8. The method of claim 1, further comprising:
receiving an updated three-dimensional model;
repeating the steps of slicing, grouping, computing, and applying to determine a modified printing orientation; and
superimposing the modified printing orientation on the three-dimensional model for display.

9. The method of claim 1, further comprising, prior to slicing the three-dimensional model, selecting a thickness for each slice that satisfies a time constraint related to an allotted time for determining the printing orientation.

10. A non-transitory computer-readable storage medium including instructions that, when executed by a processor, cause the processor to optimize the orientation of a three-dimensional model for three-dimensional printing by performing the steps of:
slicing the three-dimensional model to produce multiple two-dimensional cross-sections;
grouping at least two of the two-dimensional cross-sections into a first virtual cross-section based on connectivity characteristics of the three-dimensional model;
computing a first structural stress associated with the first virtual cross-section based on bending moment equilibrium;
applying a weakness heuristic to the first structural stress to determine a weakness metric for the first virtual cross-section; and
based on the weakness heuristic and an orientation of the first virtual cross-section, selecting a printing orientation for the three-dimensional model.

11. The non-transitory computer-readable storage medium of claim 10, wherein selecting the printing orientation comprises:
weighting a direction associated with a neutral axis of the first virtual cross-section based on the weakness metric for the first virtual cross-section to produce a first weighted direction;
weighting a direction associated with a neutral axis of a second virtual cross-section based on a weakness metric for the second virtual cross-section to produce a second weighted direction; and
setting the printing orientation to a direction most orthogonal to the first weighted direction and the second weighted direction.

12. The non-transitory computer-readable storage medium of claim 10, wherein selecting the printing orientation comprises:
comparing the weakness metric for the first virtual cross-section to a weakness metric for a second virtual cross-section; and
if the weakness metric for the first virtual cross-section is greater than the weakness metric for the second virtual cross section, then indicating that a direction associated with a neutral axis of the first virtual cross-section is a weakest direction, or
if the weakness metric for the first virtual cross-section is not greater than the weakness metric for the second virtual cross section, then indicating that a direction associated with a neutral axis of the second virtual cross-section is a weakest direction; and
setting the printing orientation to a direction orthogonal to the weakest direction.

13. The non-transitory computer-readable storage medium of claim 10, wherein the connectivity characteristics indicate that the at least two of the two-dimensional cross sections collectively influence the distribution of an external force applied to the three-dimensional model when the three-dimensional object is fixed at a first location.

14. The non-transitory computer-readable storage medium of claim 10, wherein computing the first structural stress comprises:
selecting a neutral axis based on each of the two-dimensional cross-sections included in the first virtual cross-section; and
applying bending moment equilibrium to the virtual cross-section based on the neutral axis.

15. The non-transitory computer-readable storage medium of claim 10, further comprising, prior to slicing the three-dimensional model, selecting a first number of slicing axes, wherein each slicing axis is orthogonal to a potential printing orientation, and the number of slicing axes satisfies an accuracy constraint.

16. The non-transitory computer-readable storage medium of claim 10, further comprising superimposing at least one of the weakness metric and the printing orientation on the three-dimensional model for display.

17. The non-transitory computer-readable storage medium of claim 10, further comprising:
receiving an updated three-dimensional model;
repeating the steps of slicing, grouping, computing, and applying to determine a modified printing orientation; and
superimposing the modified printing orientation on the three-dimensional model for display.

18. The non-transitory computer-readable storage medium of claim 10, further comprising, prior to slicing the three-dimensional model, selecting a thickness for each slice that satisfies a time constraint related to an allotted time for determining the printing orientation.

19. A system configured to optimize the orientation of a three-dimensional model for three-dimensional printing, the system comprising:
a processing unit configured to:
slice the three-dimensional model to produce multiple two-dimensional cross-sections;

group at least two of the two-dimensional cross-sections into a first virtual cross-section based on connectivity characteristics of the three-dimensional model;

compute a first structural stress associated with the first virtual cross-section based on bending moment equilibrium;

apply a weakness heuristic to the first structural stress to determine a weakness metric for the first virtual cross-section; and based on the weakness heuristic and an orientation of the first virtual cross-section, select a printing orientation for the three-dimensional model; and a display device coupled to the processing unit and configured to display the three-dimensional model and the selected printing orientation.

20. The system of claim 19, wherein selecting the printing orientation comprises:

weighting a direction associated with a neutral axis of the first virtual cross-section based on the weakness metric for the first virtual cross-section to produce a first weighted direction;

weighting a direction associated with a neutral axis of a second virtual cross-section based on a weakness metric for the second virtual cross-section to produce a second weighted direction; and setting the printing orientation to a direction most orthogonal to the first weighted direction and the second weighted direction.

* * * * *